United States Patent
Shen et al.

(10) Patent No.: US 11,290,289 B2
(45) Date of Patent: Mar. 29, 2022

(54) SUPPLY VOLTAGE AND TEMPERATURE INSENSITIVE PHYSICALLY UNCLONABLE FUNCTION CIRCUIT

(71) Applicant: Intel Corporation, Santa Clara, CA (US)

(72) Inventors: Kuan-Yueh Shen, Portland, OR (US); Rachael Parker, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 272 days.

(21) Appl. No.: 16/144,970

(22) Filed: Sep. 27, 2018

(65) Prior Publication Data
US 2020/0106625 A1   Apr. 2, 2020

(51) Int. Cl.
*H04L 9/32* (2006.01)
*H03K 5/13* (2014.01)
*G06F 21/72* (2013.01)

(52) U.S. Cl.
CPC .......... *H04L 9/3278* (2013.01); *G06F 21/72* (2013.01); *H03K 5/13* (2013.01); *H04L 2209/12* (2013.01)

(58) Field of Classification Search
CPC ... H04L 9/0866; H04L 9/0894; H04L 9/3278; H04L 2209/12; H04L 2209/34; H03K 5/13; G06F 21/73; G06F 21/72
USPC ....................................................... 380/255
See application file for complete search history.

(56) References Cited

U.S. PATENT DOCUMENTS

| | | | |
|---|---|---|---|
| 8,683,210 B2* | 3/2014 | Devadas | H04L 9/3278 713/185 |
| 9,590,626 B1* | 3/2017 | Pedersen | G01R 31/3177 |
| 2014/0035613 A1 | 2/2014 | Bucci et al. | |
| 2014/0327469 A1 | 11/2014 | Pfeiffer et al. | |
| 2015/0008763 A1 | 1/2015 | Kuenemund | |
| 2017/0279448 A1 | 9/2017 | Wang et al. | |
| 2018/0091293 A1 | 3/2018 | Suresh et al. | |
| 2018/0351753 A1* | 12/2018 | Gardner | H04L 9/085 |

OTHER PUBLICATIONS

An improved fast acquisition phase frequency detector for high speed phaselocked loops Lei Zhang, Zongmin Wang, Tieliang Zhang, and Xinmang Peng Apr. 18, 2018 (Year: 2018).*
DScanPUF: A Delay-Based Physical Unclonable Function Built Into Scan Chain Yu Zheng, Student Member, IEEE, Fengchao Zhang, Student Member, IEEE, and Swarup Bhunia, Senior Member, IEEE (Year: 2015).*
Physical Unclonable Functions based on Temperature Compensated Ring Oscillators Sha Tao and Elena Dubrova (Year: 2016).*
International Search Report and Written Opinion from PCT/US2019/039056 dated Oct. 16, 2019, 14 pgs.

(Continued)

*Primary Examiner* — Benjamin A Kaplan
(74) *Attorney, Agent, or Firm* — Schwabe, Williamson & Wyatt, P.C.

(57) ABSTRACT

An apparatus is provided which comprises: a phase detector to receive a reference clock and a feedback clock; and one or more switchable heat elements controllable by an output of the phase detector, wherein the one or more switchable heat elements are coupled to a physically unclonable function circuit.

18 Claims, 7 Drawing Sheets

(56) References Cited

OTHER PUBLICATIONS

Mathew, Sanu K. et al., "A 0.19pJ/b PVT-Variation-Tolerant Hybrid Physically Unclonable Function Circuit for 100% Stable Secure Key Generation in 22nm CMOS", ISCC 2014, Session 16, SoC Building Blocks, 16.2, 3 pgs.

Nikoozadeh, Amin et al., "An Analysis of Latch Comparator Offset Due to Load Capacitor Mismatch", IEEE Transactions on Circuits and Systems, vol. 53, No. 12, Dec. 2006, 5 pgs.

Yang, Kaiyuan et al., "A 535F/\2 2-Transistor Amplifier-Based Physically Unclonable Function (PUF) with 1.67% Native Instability", ISCC 2017, Session 8, Digital PLLs and Security Circuits, 8.3, 3 pgs.

International Preliminary Report on Patentability from PCT/US2019/039056 dated Apr. 8, 2021, 10 pgs.

\* cited by examiner

SUPPLY VOLTAGE AND TEMPERATURE INSENSITIVE PHYSICALLY UNCLONABLE FUNCTION CIRCUIT

BACKGROUND

Ubiquitous electronic platforms contain cryptographic systems to perform security functions such as securing communications among devices or between a device and cloud. These cryptographic systems rely on the concept of a unique secure binary key which is permanently stored on each device and unknown to adversaries. Traditional methods of storing cryptographic keys have included use of non-volatile memory (NVM) such as one-time-programmable fuses. These methods however are increasingly susceptible to attacks such as optical inspection, device probing, or insider attacks. Physically unclonable function circuits (PUFs) provide a solution to enable unique, secure, and permanent keys. However, current PUFs suffer from high bit error rates (BER) caused largely by temperature and supply variations. For example for a nominally matched transistor pair A and A', at cold temperature, transistor A with slightly higher channel mobility and slightly higher threshold voltage can result in a higher conduction current than transistor A' while at hot temperature, as both the mobility and threshold voltage decrease, transistor A' can instead have a higher current than transistor A.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1:
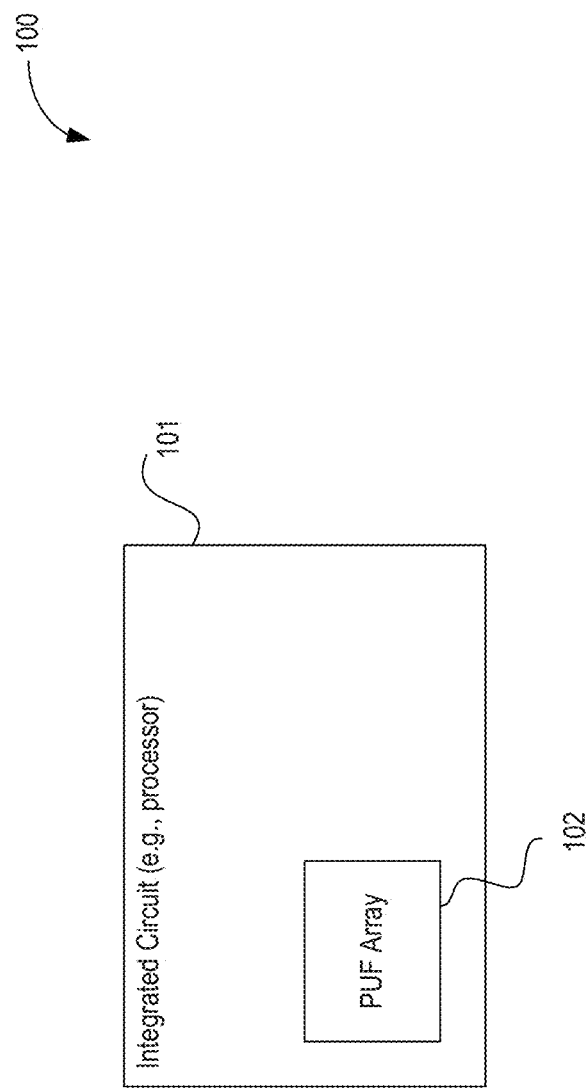
FIG. 1 illustrates an apparatus comprising a processor or an integrated circuit (IC) having one or more Physically Unclonable Function (PUF) circuit, according to some embodiments of the disclosure.

Physically Unclonable Function (PUF) circuits are becoming vital ingredients of cryptosystems within electronic devices. These devices use PUFs, for example, to create a random private binary key that is derived from naturally occurring variation of electronic devices. PUF cells harness the entropy contained in random process variation to generate unique device-specific identifications (IDs). With proper design, these IDs are well suited for cryptographic use because they are known only to the device's cryptographic system itself While the supply variation can be readily improved by using a supply voltage regulator, this invention provides PUF cell embodiments with strong built-in power supply noise rejection as well as a method to reduce temperature variation range. Various embodiments describe a supply voltage and temperature insensitive, multi-stage machine-learning attack resistant PUF circuit for secure authentication of devices. The PUF cells or bit-cells use matched, wide gate-source shorted transistor pair to load cross-coupled, minimal sized transistor pair whose mismatch dominates the bit-cell outcome. In various embodiments, all the transistors of a PUF bit-cell are of the same type, either p-type or n-type; so their systematic variation track one another inside the PUF bit-cell. The large or wide gate-source shorted transistors offer supply voltage-insensitive current and significant output capacitance that reduce kT/C thermal noise at the PUF output nets. In some embodiments, PUF array has a thermal feedback system to keep the PUF temperature hot enough, reducing the temperature range/variation.

Low bit error rate (BER) is a desired metric to pursue for PUF arrays because any erroneous bits on a given evaluation will need to be corrected with ECC (error correction code) and require hardware such as BCH (Bose-Chaudhuri-Hocquenghem) encoders/decoders along with non-volatile memory to store the ECC helper data. To meet low BER, PUF design considerations include: (1) device thermal (and possibly 1/f) noise that degrades BER; (2) the sensitivity of BER to supply voltage variation; (3) the sensitivity of BER to temperature variation; and (4) the concern from device stress and aging. Reducing PUF BER leads to reduction of circuit risk (e.g., by using up the BER budget), embedded NVM (non-volatile memory) area, and ECC circuit area. The PUF bit-cell of various embodiments meets the above considerations and more. Other technical effects will be evident from the various figures and embodiments.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices.

The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function.

The term "signal" may refer to at least one current signal, voltage signal, magnetic signal, or data/clock signal. The meaning of "a," "an," and "the" include plural references. The meaning of "in" includes "in" and "on."

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The term "adjacent" here generally refers to a position of a thing being next to (e.g., immediately next to or close to with one or more things between them) or adjoining another thing (e.g., abutting it).

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

Here, the term "backend" generally refers to a section of a die which is opposite of a "frontend" and where an IC (integrated circuit) package couples to IC die bumps. For example, high level metal layers (e.g., metal layer 6 and above in a ten-metal stack die) and corresponding vias that are closer to a die package are considered part of the backend of the die. Conversely, the term "frontend" generally refers to a section of the die that includes the active region (e.g., where transistors are fabricated) and low-level metal layers and corresponding vias that are closer to the active region (e.g., metal layer 5 and below in the ten-metal stack die example).

For purposes of the embodiments, the transistors in various circuits and logic blocks described here are metal oxide semiconductor (MOS) transistors or their derivatives, where the MOS transistors include drain, source, gate, and bulk terminals. The transistors and/or the MOS transistor derivatives also include Tri-Gate and FinFET transistors, Gate All Around Cylindrical Transistors, Tunneling FET (TFET), Square Wire, or Rectangular Ribbon Transistors, ferroelectric FET (FeFETs), or other devices implementing transistor functionality like carbon nano tubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors—BJT PNP/NPN, BiCMOS, CMOS, etc., may be used without departing from the scope of the disclosure.

It is pointed out that those elements of various figures having the same reference numbers (or names) as the elements of any other figure can operate or function in any manner similar to that described, but are not limited to such.

FIG. 1 illustrates apparatus 100 comprising processor 101 or an integrated circuit (IC) having a Physically Unclonable Function (PUF) array 102, according to some embodiments of the disclosure. In some embodiments, processor 101 is an integrated circuit such as a general purpose central processing unit (CPU), an application specific integrated circuit (ASIC), digital signal processor (DSP), router chip (e.g., a networking processor), baseband processor, IoT edge device, or any other processor that would benefit from having a PUF circuit.

In some embodiments, PUF array 102 comprises distributed bit-cells or bit-cells organized in rows and columns. These PUF bits cells comprise matched, wide gate-source shorted transistors (e.g., GNAC-like device when it is an n-type MOSFET) to load a pair of cross-coupled, minimal sized n-type pair (or p-type pair) whose mismatch dominates the bit-cell outcome. The large or wide gate-source shorted transistors offer supply-voltage-insensitive current and significant output capacitance that reduces kT/C thermal noise at PUF output nets. In some embodiments, PUF array 102 has a thermal feedback system to keep PUF temperature hot enough, reducing the temperature range/variation.

Figure 2:
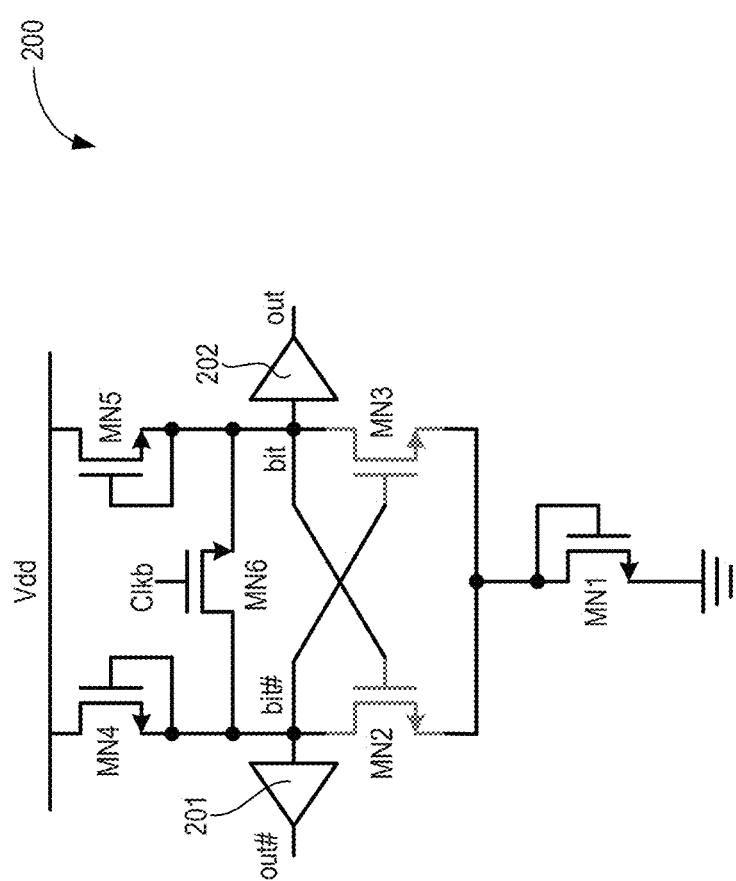
FIG. 2 illustrates a PUF circuit cell with all transistors of an n-conductivity type, according to some embodiments of the disclosure.

FIG. 2 illustrates a PUF circuit cell 200 with all transistors of an n-conductivity type, according to some embodiments of the disclosure. PUF circuit bit-cell 200 comprises n-conductivity type (or n-type) transistors MN1, MN2, MN3, MN4, MN5, and MN6 coupled between power supply rail Vdd and ground supply rail Vss. Transistors MN4 and MN5 are gate-source shorted or connected devices and also referred to as gate-source shorted transistors. These two gate-source shorted transistors are wide devices that are matched and supply leakage current as two current sources into a pair of cross-coupled n-type transistors MN2 and MN3, which have minimal size (e.g., minimum size allowable by a process technology node). Here the term "matched" refers to equivalent layout floorplan (e.g., pitch), device sizes and orientations so as to produce identical or near identical electrical performance.

In some embodiments, devices MN2 and MN3 are substantially smaller in size and area compared to gate-source shorted transistors MN4 and MN5. The gate-source shorted transistors are made wide enough or large enough to reduce or minimize their mismatch in threshold voltage (Vt) and leakage, to provide higher output capacitances at bit and bit-# nodes. As such, thermal nose (KT/Cout, where "Cout" is the output capacitance on node bit# or bit) is lowered, which allows to flip the storage value in bit and bit# almost rail-to-rail.

In some embodiments, a clock (clkb, where clkb is an inverse of clock clk) is used to reset to the bit-cell 200 by bridging nodes bit and bit#. For example, when clock clkb is logic low, the bit-cell resets the voltages on nodes bit and bit# near an average level of left and right side's trip voltages. Here, "left side" refers to the side of bit-cell 200 comprising transistors MN2 and MN4, while the "right side" refers to the side of bit-cell 200 comprising transistors MN3 and MN5. Such a reset to near trip-point improves the bit-cell outcome uncertainty. The trip-point is almost the threshold voltage (Vt) of the transistor MN2 and transistor MN3, and may not cause high DC current or power as the n-type transistor pair (MN2 and MN3) are biased by the leakage current of gate-source shorted transistors MN4 and MN5.

In some embodiments, bit-cell 200 has transistor variation dominated by the cross-coupled n-type transistor pair MN2 and MN3 which are the smallest sized transistors allowable by a process node. At onset leaving the bit-cell reset phase, the n-type transistor pair (MN2 and MN3) are biased near each's Vt. Their Vt mismatch, which is dictated by the transistor electrostatics and characterized in a Pelgrom plot, is a weak function of temperature and supply Vdd (e.g., which n-type transistor MN2 or MN3 has higher Vt than the other is fixed; the order may not change with temperature and supply Vdd).

In some embodiment, nodes bit# and bit are coupled to non-inverting buffers 201 and 202, respectively to provide out# and out, respectively. In some embodiments, buffers 201 and 202 comprise inverters. For example, buffers 201 and 202 are inverting buffers. In bit-cell 200, all transistors (minus the buffers 201 and 202) are of the same conductivity type (e.g., n-conductivity type).

Figure 3:
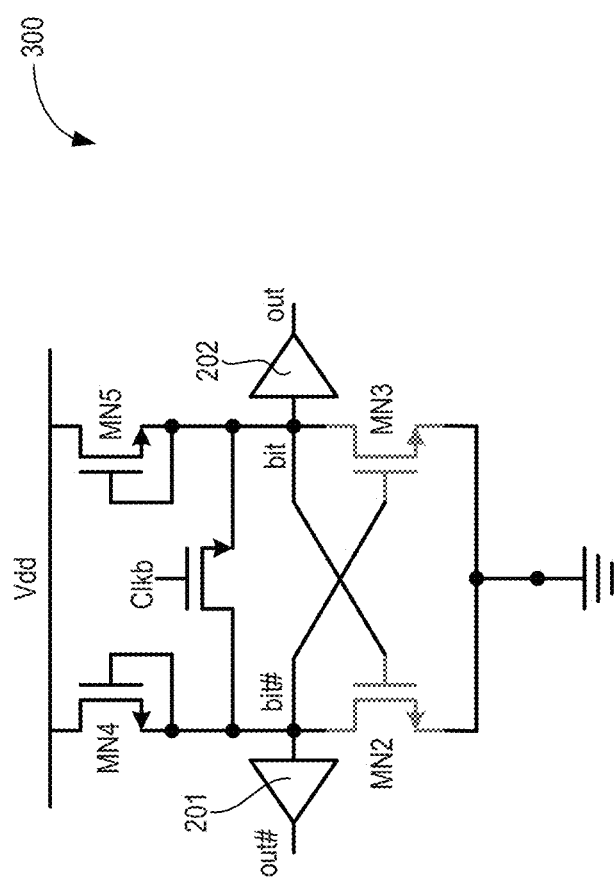
FIG. 3 illustrates a PUF circuit cell with all transistors of an n-conductivity type, according to some embodiments of the disclosure.

FIG. 3 illustrates a PUF circuit cell 300 with all transistors of an n-conductivity type, according to some embodiments of the disclosure. PUF circuit cell 300 is similar to PUF 200 except that diode-connected current source MN1 is removed and replaced with ground. Technical effect wise, PUF circuit cell 300 operates similar to PUF circuit cell 200.

Figure 4:
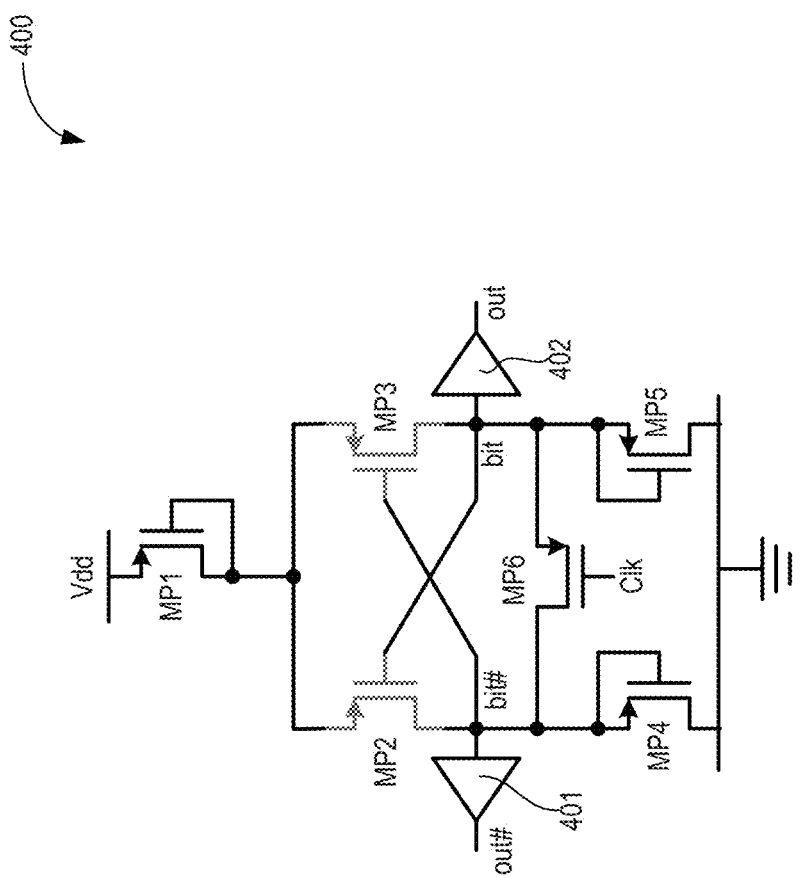
FIG. 4 illustrates a PUF circuit cell with all transistors of a p-conductivity type, according to some embodiments of the disclosure.

FIG. 4 illustrates a PUF circuit cell 400 with all transistors of a p-conductivity type, according to some embodiments of the disclosure. PUF circuit cell 400 is a flipped version of PUF circuit cell 200. PUF circuit bit-cell 400 comprises p-conductivity type (or p-type) transistors MP1, MP2, MP3, MP4, MP5, and MP6 coupled between power supply rail Vdd and ground supply rail Vss. Transistors MP4 and MP5 are diode-connected devices and also referred to as p-type gate-source shorted transistors. These two gate-source shorted transistors are wide devices that are matched and supply leakage current as two current sources into a pair of cross-coupled p-type transistors MP2 and MP3, which have minimal size (e.g., minimum size allowable by a process technology node). Devices MP2 and MP3 are substantially smaller in size and area compared to p-type gate-source shorted transistor MP4 and MP5. The p-type gate-source shorted transistors are made wide enough or large enough to reduce or minimize their mismatch in threshold voltage (Vt) and leakage, to provide higher output capacitances at bit and bit-# nodes. As such, thermal nose (KT/Cout, where Count is the output capacitance on node bit# or bit) is lowered, which allows to flip the storage value in bit and bit# almost rail-to-rail.

In some embodiments, a clock (clk, where clk is an inverse of clock clkb) is used to reset to the bit-cell 200 by bridging nodes bit and bit#. For example, when clock clk is logic low, the bit-cell resets the voltages on nodes bit and bit# near the average level of left and right side's trip voltages. Here, "left side" refers to the side of bit-cell 400 comprising transistors MP2 and MP4, while the "right side" refers to the side of bit-cell 400 comprising transistors MP3 and MP5. Such a reset to near trip-point improves the bit-cell outcome uncertainty. The trip-point is almost the threshold voltage (Vt) of the transistor MP2 and transistor MP3, and may not cause high DC current or power as the p-type transistor pair (MP2 and MP3) are biased by the leakage current of p-type gate-source shorted transistors MP4 and MP5.

In some embodiments, bit-cell 400 has transistor variation dominated by the cross-coupled p-type transistor pair MP2 and MP3 which are the smallest sized transistors allowable by a process node. At onset leaving the bit-cell reset phase, the p-type transistor pair (MP2 and MP3) are biased near each's Vt. Their Vt mismatch, which is dictated by the transistor electrostatics and characterized in a Pelgrom plot, is a weak function of temperature and supply Vdd (e.g., which p-type transistor MP2 or MP3 has higher Vt than the other is fixed; the order may not change with temperature and supply Vdd).

In some embodiment, nodes bit# and bit are coupled to non-inverting buffers 401 and 402, respectively to provide out# and out, respectively. In some embodiments, buffers 401 and 402 comprise inverters. For example, buffers 401 and 402 are inverting buffers. In bit-cell 400 all transistors (minus buffers 401 and 402) are of the same conductivity type (e.g., p-conductivity type).

Figure 5:
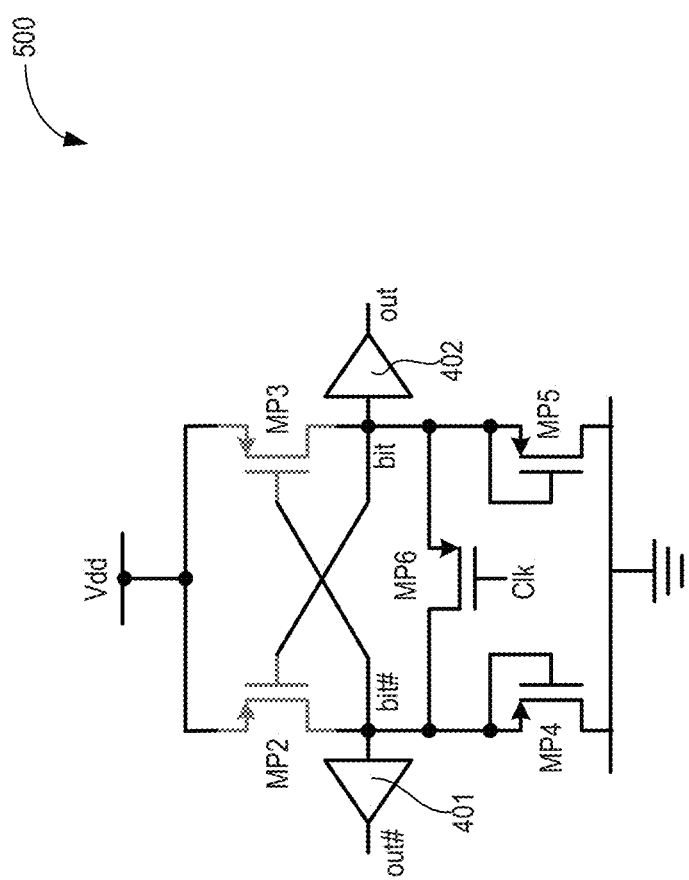
FIG. 5 illustrates a PUF circuit cell with all transistors of a p-conductivity type, according to some embodiments of the disclosure.

FIG. 5 illustrates a PUF circuit cell 500 with all transistors of a p-conductivity type, according to some embodiments of the disclosure. PUF circuit cell 500 is similar to PUF 400 except that diode-connected current source MP1 is removed and replaced with supply. Technical effect wise, PUF circuit cell 500 operates similar to PUF circuit cell 400.

Figure 6:
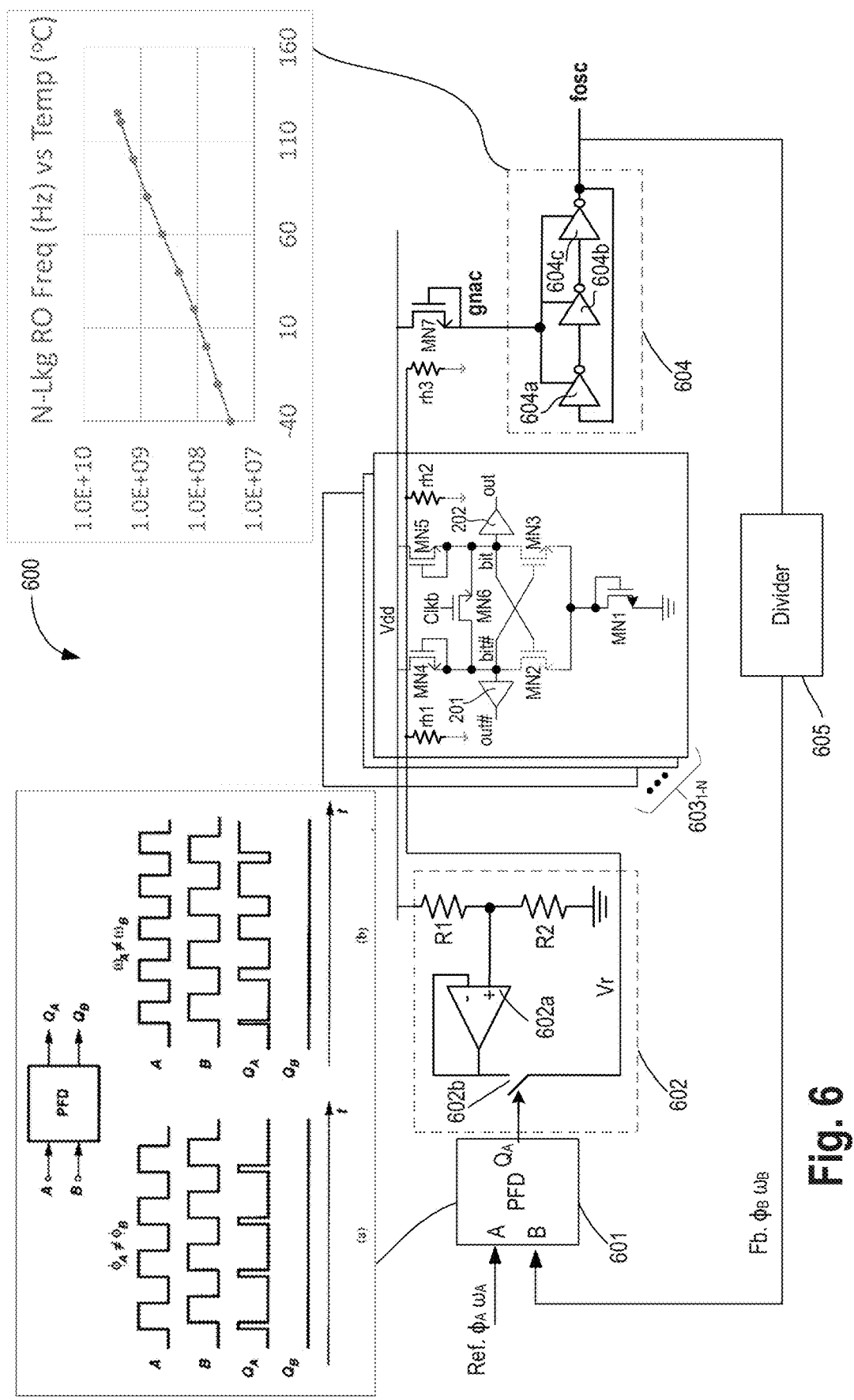
FIG. 6 illustrates a circuitry comprising a heat locked loop (HLL) with one or more PUF circuits, in accordance with some embodiments.

FIG. 6 illustrates a circuitry 600 comprising a heat locked loop (HLL) with one or more PUF circuits, in accordance with some embodiments. In some embodiments, circuitry 600 comprises a phase detector (or phase frequency detector (PFD) 601, distributed heater circuitry 602, PUF cells $603_{1-N}$ (e.g., any one type of PUF bit-cells 200, 300, 400, 500), where 'N' is greater than one, oscillator 604, power supply coupled gate-source shorted transistor MN7 which is coupled to oscillator 604, and divider 605.

In some embodiments, phase detector or PFD 601 is any suitable phase frequency detector that can identify phase and/or frequency differences between two inputs—Reference clock (Ref.) with phase $\Phi_A$ and frequency $\omega_A$, and feedback clock (Fb.) with phase $\Phi_B$ and frequency $\omega_B$. The PFD 601 can incorporate a phase chopper. In some embodiments, the phase frequency detector or PFD 601 can be replaced with a time-to-digital converter (TDC). The output of TDC is a digital code providing a difference between phases in time domain of phase $\Phi_A$ and phase $\Phi_B$. The output $Q_A$ of phase detector or PFD 601 is a pulse whose pulse width indicates the phase difference of phase $\Phi_A$ and phase $\Phi_B$. In some embodiments, the output $Q_A$ controls the distributed heater circuitry 602 and causes the distributed heater circuitry 602 to turn on or off the heat to the PUF cells and the power supply coupled gate-source shorted transistor MN7.

In some embodiments, the distributed heater circuitry 602 comprises amplifier 602a, resistors or resistive devices R1 and R2, and one or more switches 602b. The switches 602b can be implemented using transistors. In various embodiments, amplifier 602a is unity gain amplifier which is used to provide a bias voltage and current to heating distributed, identical elements rh1, rh2, and rh3 where rh1 and rh2 can be deployed inside each PUF bit-cell. The heating elements rh1, rh2, and rh3 can be resistive devices, resistors, or the like. The heating elements rh1, rh2, and rh3 are coupled to ground. When switches 602b are closed, current passes through heating elements rh1, rh2, and rh3 causing them to radiate heat, increasing the local temperature. In some embodiments, heating elements rh1, rh2 are positioned near the gate-source shorted transistors MN4 and MN5 of a PUF bit-cell (e.g., $603_1$). In some embodiments, heating element rh3 is positioned near gate-source shorted transistor MN7.

In some embodiments, gate-source shorted transistor MN7 is coupled to supply Vdd and oscillator 604. In some embodiments, oscillator 604 is a ring oscillator comprising inverters 604a, 604b, and 604c coupled together in a ring formation. In some embodiments, the oscillator 604 is a current starved oscillator. The frequency of the oscillator 604 has a temperature dependency as illustrated with the accompanying plot. The output of the oscillator fosc is then divided by divider 605 to generate Fb. Any suitable integer or fractional divider can be used to implement divider 605.

In some embodiments, distributed heater circuitry 602 keeps bit-cell $603_1$ warm or hot. First, since the gate-source shorted transistor leakage current is exponentially proportional to temperature, at low temperatures such as −40° C. the current could be too low for the bit-cell to evolve an outcome promptly. Second, narrowing the temperature range (e.g., −40° C. to 125° C. span) to, say, a narrower range (e.g., 80° C. to 125° C.) helps maintain the BER deviation.

In some embodiments, the current-starved, or leakage starved, ring oscillator (RO) 604 is driven by identical gate-source shorted transistor (e.g., MN7) as those in PUF bit-cell $601_1$ sends its output frequency fosc to a PFD 601 at its input B. The PFD's input A is Ref., for example, at 100 MHz, or a relatively temperature insensitive frequency. If the local temperature of the gate-source shorted transistor(s) is not high enough, PFD's output pulse at $Q_A$ will keep sinking more current to the distributed heating elements rh1, rh2, and rh3 with a larger duty cycle, raising the local temperature of the source-gate shorted transistors in both nearby PUF bit-cells $603_{1-N}$ and the oscillator 604. When enough heat is generated, the $Q_A$ output becomes pulses of small duty cycle (e.g., near 1%, or approximately 100 ps) so that the distributed heating elements rh1, rh2, and rh3 can reach a steady state.

The distributed heating elements rh1, rh2, and rh3 can be made of frontend devices and/or backend metals, distributed over the gate-source shorted transistors in the bit-cells $603_{1-N}$ and the leakage oscillator 604. If the $Q_A$ pulse width is always higher than certain threshold set by a delay line, the heater's supply reference, Vr, can self-increase to a higher level, further increasing the heater's IR drop and thus temperature. Once the temperature is raised to a certain level, the heat locked loop (HLL) locks that temperature and maintains it. As such, the performance of the PUF bit-cell remains consistent, give a fixed supply voltage.

Figure 7:
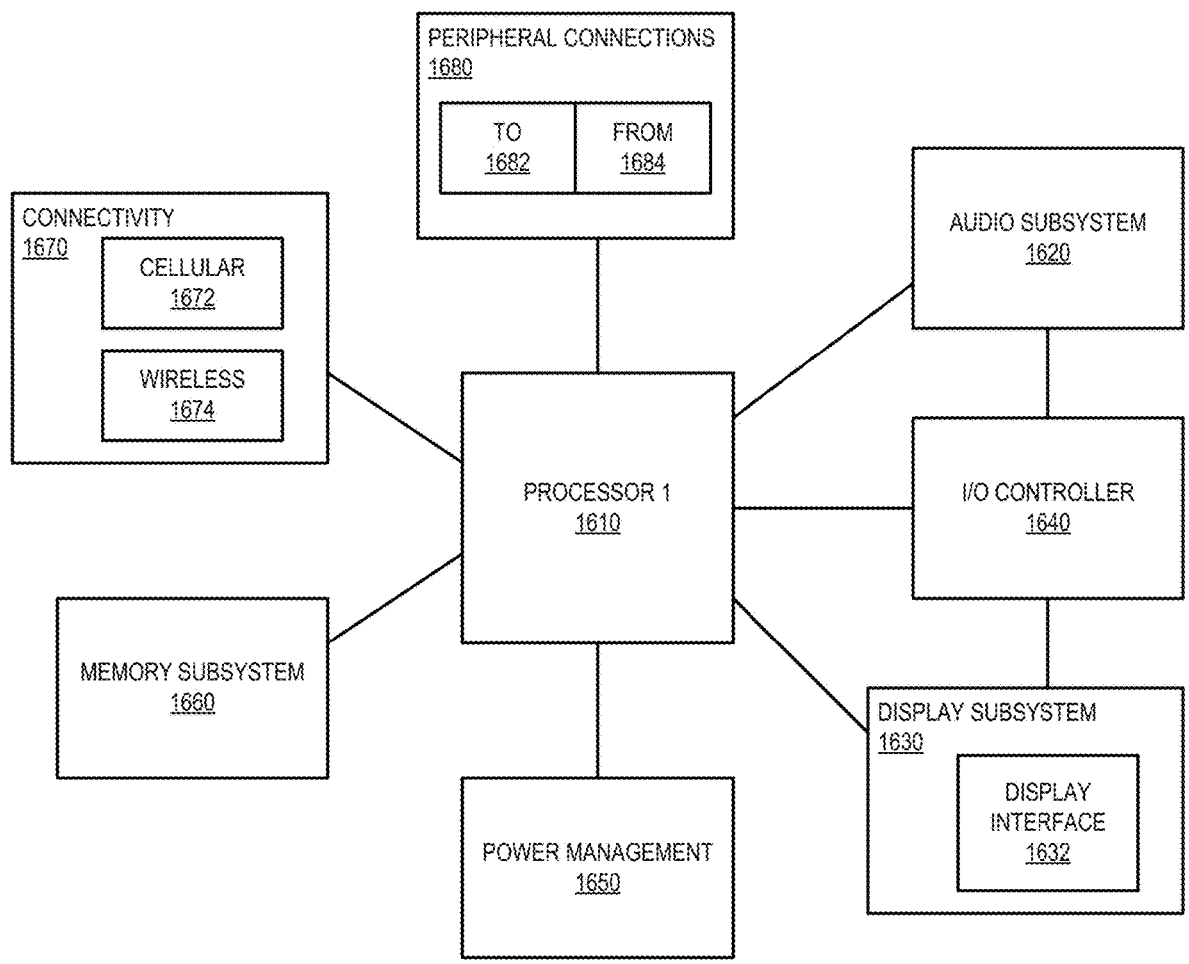
FIG. 7 illustrates a smart device or a computer system or a System-on-Chip (SoC) with one or more PUFs and/or one or more HLL with one or more PUF circuits, according to some embodiments.

FIG. 7 illustrates a smart device or a computer system or a System-on-Chip (SoC) with one or more PUFs and/or one or more HLL with one or more PUT circuits, according to some embodiments. FIG. 7 illustrates a block diagram of an embodiment of a mobile device in which flat surface interface connectors could be used. In some embodiments, computing device 1600 represents a mobile computing device, such as a computing tablet, a mobile phone or smart-phone, a wireless-enabled e-reader, or other wireless mobile device. It will be understood that certain components are shown generally, and not all components of such a device are shown in computing device 1600.

In some embodiments, computing device 1600 includes a first processor 1610 with one or more PUFs and/or one or more HLL with one or more PUT circuits, according to some embodiments discussed. Other blocks of the computing device 1600 may also include one or more PUFs and/or one or more HLL with one or more PUT circuits, according to some embodiments. The various embodiments of the present disclosure may also comprise a network interface within 1670 such as a wireless interface so that a system embodiment may be incorporated into a wireless device, for example, cell phone or personal digital assistant.

In one embodiment, processor 1610 can include one or more physical devices, such as microprocessors, application processors, microcontrollers, programmable logic devices, or other processing means. The processing operations performed by processor 1610 include the execution of an operating platform or operating system on which applications and/or device functions are executed. The processing operations include operations related to I/O (input/output) with a human user or with other devices, operations related to power management, and/or operations related to connecting the computing device 1600 to another device. The processing operations may also include operations related to audio I/O and/or display I/O.

In one embodiment, computing device 1600 includes audio subsystem 1620, which represents hardware (e.g., audio hardware and audio circuits) and software (e.g., drivers, codecs) components associated with providing audio functions to the computing device. Audio functions can include speaker and/or headphone output, as well as microphone input. In some embodiments, audio subsystem 1620 includes apparatus and/or machine executable instructions to avoid self-hearing, according to some embodiments. Devices for such functions can be integrated into computing device 1600, or connected to the computing device 1600. In one embodiment, a user interacts with the computing device 1600 by providing audio commands that are received and processed by processor 1610.

Display subsystem 1630 represents hardware (e.g., display devices) and software (e.g., drivers) components that provide a visual and/or tactile display for a user to interact with the computing device 1600. Display subsystem 1630 includes display interface 1632, which includes the particular screen or hardware device used to provide a display to a user. In one embodiment, display interface 1632 includes logic separate from processor 1610 to perform at least some processing related to the display. In one embodiment, display subsystem 1630 includes a touch screen (or touch pad) device that provides both output and input to a user.

I/O controller 1640 represents hardware devices and software components related to interaction with a user. I/O controller 1640 is operable to manage hardware that is part of audio subsystem 1620 and/or display subsystem 1630. Additionally, I/O controller 1640 illustrates a connection point for additional devices that connect to computing device 1600 through which a user might interact with the system. For example, devices that can be attached to the computing device 1600 might include microphone devices, speaker or stereo systems, video systems or other display devices, keyboard or keypad devices, or other I/O devices for use with specific applications such as card readers or other devices.

As mentioned above, I/O controller 1640 can interact with audio subsystem 1620 and/or display subsystem 1630. For example, input through a microphone or other audio device can provide input or commands for one or more applications or functions of the computing device 1600. Additionally, audio output can be provided instead of, or in addition to display output. In another example, if display subsystem 1630 includes a touch screen, the display device also acts as an input device, which can be at least partially managed by I/O controller 1640. There can also be additional buttons or switches on the computing device 1600 to provide I/O functions managed by I/O controller 1640.

In one embodiment, I/O controller 1640 manages devices such as accelerometers, cameras, light sensors or other environmental sensors, or other hardware that can be included in the computing device 1600. The input can be part of direct user interaction, as well as providing environmental input to the system to influence its operations (such as filtering for noise, adjusting displays for brightness detection, applying a flash for a camera, or other features).

In one embodiment, computing device 1600 includes power management 1650 that manages battery power usage, charging of the battery, and features related to power saving operation. Memory subsystem 1660 includes memory devices for storing information in computing device 1600. Memory can include nonvolatile (state does not change if power to the memory device is interrupted) and/or volatile (state is indeterminate if power to the memory device is interrupted) memory devices. Memory subsystem 1660 can store application data, user data, music, photos, documents, or other data, as well as system data (whether long-term or temporary) related to the execution of the applications and functions of the computing device 1600.

Elements of embodiments are also provided as a machine-readable medium (e.g., memory 1660) for storing the computer-executable instructions (e.g., instructions to implement any other processes discussed herein). The machine-readable medium (e.g., memory 1660) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Connectivity 1670 includes hardware devices (e.g., wireless and/or wired connectors and communication hardware) and software components (e.g., drivers, protocol stacks) to enable the computing device 1600 to communicate with external devices. The computing device 1600 could be separate devices, such as other computing devices, wireless access points or base stations, as well as peripherals such as headsets, printers, or other devices.

Connectivity 1670 can include multiple different types of connectivity. To generalize, the computing device 1600 is illustrated with cellular connectivity 1672 and wireless connectivity 1674. Cellular connectivity 1672 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 1674 refers to wireless connectivity that is not cellular, and can include personal area networks (such as Bluetooth, Near Field, etc.), local area networks (such as Wi-Fi), and/or wide area networks (such as WiMax), or other wireless communication.

Peripheral connections 1680 include hardware interfaces and connectors, as well as software components (e.g., drivers, protocol stacks) to make peripheral connections. It will be understood that the computing device 1600 could be a peripheral device ("to" 1682) to other computing devices, as well as have peripheral devices ("from" 1684) connected to it. The computing device 1600 commonly has a "docking" connector to connect to other computing devices for purposes such as managing (e.g., downloading and/or uploading, changing, synchronizing) content on computing device 1600. Additionally, a docking connector can allow computing device 1600 to connect to certain peripherals that allow the computing device 1600 to control content output, for example, to audiovisual or other systems.

In addition to a proprietary docking connector or other proprietary connection hardware, the computing device 1600 can make peripheral connections 1680 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. An apparatus comprising: a first transistor;
a second transistor connected to the first transistor;
a third transistor connected to the first and second transistors, wherein the third transistor is coupled to a supply rail, and wherein the third transistor has a source terminal connected to a gate terminal of the third transistor;
a fourth transistor connected to the first and second transistors, wherein the fourth transistor is connected to the supply rail, and wherein the fourth transistor has a source terminal connected to a gate terminal of the fourth transistor; and
a fifth transistor having source and drain terminals connected to the third and fourth transistors, respectively, wherein the fifth transistor is controllable by a clock, wherein the first, second, third, fourth, and fifth transistors have a same conductivity type.

2. The apparatus of claim 1, wherein the supply rail is a first supply rail, and wherein source terminals of the second and third transistors are coupled to a second supply rail, or wherein the apparatus comprises a diode-connected transistor coupled to the source terminals of the first and second transistors.

3. The apparatus of claim 1, wherein a drain terminal of the first transistor is coupled to a buffer, the third transistor, a gate terminal of the second transistor, and the source terminal of the fifth transistor.

4. The apparatus of claim 3, wherein the buffer is a first buffer, wherein a drain terminal of the second transistor is coupled to a second buffer, the fourth transistor, a gate terminal of the first transistor, and the drain terminal of the fifth transistor.

5. An apparatus comprising:
a phase detector to receive a reference clock and a feedback clock, wherein the phase detector is to identify as an output a difference between a phase of the reference clock and a phase of the feedback clock;
one or more switchable heat elements controllable by the output of the phase detector; and
one or more bit-cells positioned near the one or more switchable heat elements such that heat from the one or more switchable heat elements is to change electrical characteristics of the one or more bit-cells, wherein each of the one of more bit-cells comprises:
a first transistor;
a second transistor coupled to the first transistor;
a third transistor coupled to the first and second transistors, wherein the third transistor is coupled to a supply rail, and wherein the third transistor has a source terminal coupled to a gate terminal of the third transistor
a fourth transistor coupled to the first and second transistors, wherein the fourth transistor is coupled to the supply rail, and wherein the fourth transistor has a source terminal coupled to a gate terminal of the fourth transistor; and
a fifth transistor having source and drain terminals coupled to the third and fourth transistors, respectively, wherein the fifth transistor is controllable by a clock, wherein the first, second, third, fourth, and fifth transistors have a same conductivity type.

6. The apparatus of claim 5, further comprising an oscillator positioned near the one or more switchable heat elements such that heat from the one or more switchable heat elements is to change electrical characteristics of the oscillator.

7. The apparatus of claim 6, further comprising a divider coupled to the oscillator and the phase detector, wherein the divider is to provide the feedback clock.

8. The apparatus of claim 6, further comprising a transistor coupled to a supply rail and the ring oscillator, wherein the transistor is positioned near the one or more switchable heat elements such that heat from the one or more switchable heat elements is to change electrical characteristics of the transistor, wherein a source terminal and a gate terminal of the transistor are coupled together.

9. The apparatus of claim 5, wherein the supply rail is a first supply rail, and wherein source terminals of the second and third transistors are coupled to a second supply rail, or wherein the apparatus comprises a diode-connected transistor coupled to the source terminals of the first and second transistors.

10. The apparatus of claim 5, wherein a drain terminal of the first transistor is coupled to a buffer, the third transistor, a gate terminal of the second transistor, and the source terminal of the fifth transistor.

11. The apparatus of claim 10, wherein the buffer is a first buffer, wherein a drain terminal of the second transistor is coupled to a second buffer, the fourth transistor, a gate terminal of the first transistor, and the drain terminal of the fifth transistor.

12. A system comprising:
a memory to store one or more instructions;

a processor circuitry coupled to the memory, wherein the processor circuitry is to execute the one or more instructions, wherein the processor circuitry includes a physically unclonable function circuitry which includes:
- a first transistor;
- a second transistor coupled to the first transistor;
- a third transistor coupled to the first and second transistors, wherein the third transistor is coupled to a supply rail, and wherein the third transistor has a source terminal coupled to a gate terminal of the third transistor;
- a fourth transistor coupled to the first and second transistors, wherein the fourth transistor is coupled to the supply rail, and wherein the fourth transistor has a source terminal coupled to a gate terminal of the fourth transistor; and
- a fifth transistor having source and drain terminals coupled to the third and fourth transistors, respectively, wherein the fifth transistor is controllable by a clock, wherein the first, second, third, fourth, and fifth transistors have a same conductivity type; and a wireless interface communicatively coupled to the processor circuitry.

13. The system of claim 12, wherein the supply rail is a first supply rail, and wherein source terminals of the second and third transistors are coupled to a second supply rail, or wherein the apparatus comprises a diode-connected transistor coupled to the source terminals of the first and second transistors.

14. The system of claim 12, wherein a drain terminal of the first transistor is coupled to a buffer, the third transistor, a gate terminal of the second transistor, and the source terminal of the fifth transistor.

15. The system of claim 14, wherein the buffer is a first buffer, wherein a drain terminal of the second transistor is coupled to a second buffer, the fourth transistor, a gate terminal of the first transistor, and the drain terminal of the fifth transistor.

16. An apparatus comprising:
- a memory to store one or more instructions; and
- a processor circuitry to execute one or more instructions, wherein the processor circuitry includes a heat locked loop to maintain a temperature of a region that includes one or more bit-cells of physically unclonable function circuit, wherein the heat locked loop comprises:
  - a circuitry to receive a reference clock and a feedback clock, wherein the circuitry is to identify as an output a difference between a phase of the reference clock and a phase of the feedback clock; and
  - distributed heater circuitry coupled to the circuitry, wherein the distributed heater circuitry includes:
    - a switch controllable by the output of the circuitry;
    - an amplifier having a first input coupled to the switch, wherein the amplifier is a unity gain amplifier that provides a bias to one or more heat elements; and
    - resistive devices coupled to a second input of the amplifier.

17. The apparatus of claim 16, wherein the circuitry comprises one of a phase detector, phase frequency detector, or a time-to-digital converter.

18. The apparatus of claim 16, wherein the one or more bit-cells of physically unclonable function circuit are positioned near the one or more heat elements such that heat from the one or more heat elements is to change electrical characteristics of the one or more bit-cells, wherein the heat locked loop comprises:
- an oscillator positioned near the one or more heat elements such that heat from the one or more heat elements is to change electrical characteristics of the oscillator; and
- a divider coupled to the oscillator and the circuitry, wherein the divider is to provide the feedback clock.

* * * * *